US008406755B2

(12) United States Patent
Liu

(10) Patent No.: US 8,406,755 B2
(45) Date of Patent: Mar. 26, 2013

(54) METHOD FOR TESTING WIRELESS CONNECTION FUNCTION OF MOBILE PHONE

(75) Inventor: Qing-Hua Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 567 days.

(21) Appl. No.: 12/562,078

(22) Filed: Sep. 17, 2009

(65) Prior Publication Data

US 2010/0311414 A1    Dec. 9, 2010

(30) Foreign Application Priority Data

Jun. 8, 2009   (CN) .................. 2009 1 0303027

(51) Int. Cl.
*H04W 24/00*    (2009.01)
(52) U.S. Cl. .................. 455/423; 455/552.1; 455/432.1; 455/436; 455/535.2; 455/450; 455/410; 455/414.1; 370/338; 370/311; 370/329
(58) Field of Classification Search ............... 455/552.1, 455/432.1, 436, 535.2, 450, 566, 525, 410, 455/414.1, 556.1; 370/338, 311, 329, 310, 370/328, 356, 352; 709/224, 203, 249, 223; 707/10, 3
See application file for complete search history.

(56) References Cited

U.S. PATENT DOCUMENTS

| | | | |
|---|---|---|---|
| 6,904,026 B1 * | 6/2005 | Tarnanen et al. ............. 370/329 |
| 7,171,460 B2 * | 1/2007 | Kalavade et al. ............. 709/223 |
| 7,483,690 B2 * | 1/2009 | Muramatsu et al. .......... 455/410 |
| 8,073,152 B1 * | 12/2011 | Reuss .............................. 381/74 |
| 2003/0182365 A1 * | 9/2003 | Toda et al. ..................... 709/203 |
| 2005/0005007 A1 * | 1/2005 | Keohane et al. .............. 709/224 |
| 2005/0054369 A1 * | 3/2005 | Murakami ..................... 455/525 |
| 2005/0147058 A1 * | 7/2005 | Tarnanen et al. ............. 370/310 |
| 2007/0047530 A1 * | 3/2007 | Ayers et al. ................... 370/356 |
| 2007/0067297 A1 * | 3/2007 | Kublickis ......................... 707/9 |
| 2007/0269775 A1 * | 11/2007 | Andreev et al. .............. 434/156 |
| 2008/0008140 A1 * | 1/2008 | Forssell ......................... 370/338 |
| 2008/0022229 A1 * | 1/2008 | Bhumkar et al. ............. 715/838 |
| 2008/0147623 A1 * | 6/2008 | Swaminathan et al. ......... 707/3 |
| 2008/0235594 A1 * | 9/2008 | Bhumkar et al. ............. 715/738 |
| 2008/0259836 A1 * | 10/2008 | Beach .......................... 370/311 |
| 2009/0055402 A1 * | 2/2009 | Park .............................. 707/10 |
| 2009/0124284 A1 * | 5/2009 | Scherzer et al. ........... 455/552.1 |
| 2010/0075674 A1 * | 3/2010 | Lee et al. .................... 455/435.2 |
| 2010/0118851 A1 * | 5/2010 | Kim et al. ..................... 370/338 |
| 2010/0190529 A1 * | 7/2010 | Morobishi .................... 455/566 |
| 2010/0195595 A1 * | 8/2010 | Iwata ........................... 370/329 |
| 2010/0222053 A1 * | 9/2010 | GiriSrinivasaRao et al. ......................... 455/432.1 |
| 2010/0232409 A1 * | 9/2010 | Kim et al. ..................... 370/338 |
| 2010/0291907 A1 * | 11/2010 | MacNaughtan et al. ... 455/414.1 |
| 2011/0006986 A1 * | 1/2011 | Iemura .......................... 345/160 |
| 2011/0190002 A1 * | 8/2011 | Hosono ......................... 455/450 |
| 2012/0076080 A1 * | 3/2012 | Reuss ........................... 370/328 |

* cited by examiner

*Primary Examiner* — Joseph Arevalo

(74) *Attorney, Agent, or Firm* — Altis Law Group, Inc.

(57) ABSTRACT

A method is capable of testing wireless connection function of a mobile phone. Firstly, a wireless module of the mobile phone is turned on. The wireless module then searches for access points. In succession, the wireless module is connected to a first pre-set access point in the searched access points. Finally, the mobile phone accesses a first pre-set website via the wireless module and the pre-set access point.

10 Claims, 6 Drawing Sheets

METHOD FOR TESTING WIRELESS CONNECTION FUNCTION OF MOBILE PHONE

BACKGROUND

1. Technical Field

The present disclosure relates to mobile phones, and particularly to a method for testing wireless connection function of a mobile phone.

2. Description of Related Art

Portable electronic devices such as mobile phones enjoy widespread popularity. In particular, characteristics of these devices provide users with access to information and communication outlets in ways that were never before available. To ensure the continued popularity of portable electronic devices, attempts are made to further expand the flexibility and capabilities of these portable electronic devices and to further enhance the services available to users. For example, mobile phones are now capable of accessing the Internet in different ways, such as WIFI (Wireless Fidelity).

Before the mobile phones go to market, they are tested. However, it is often troublesome and time-consuming to test the wireless connection function of mobile phones in a conventional manner.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
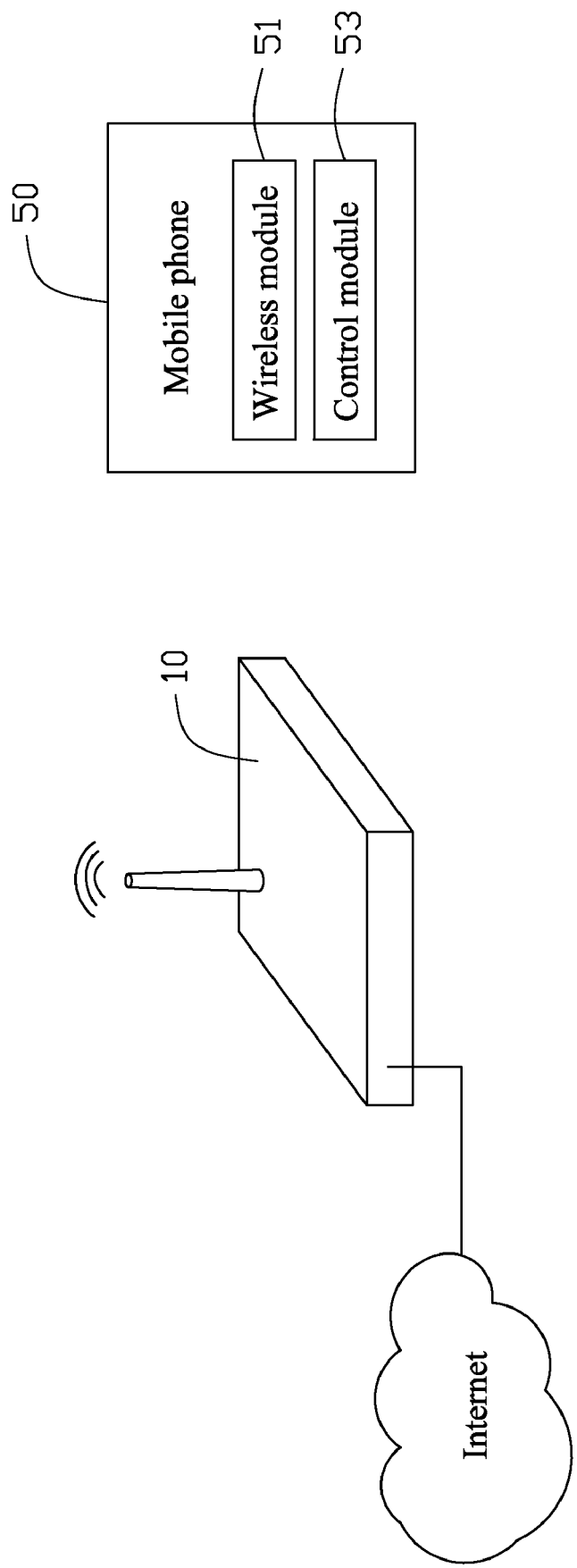
FIG. 1 is a block view of a system of an embodiment for testing wireless connection function of a mobile phone.
Figure 2:
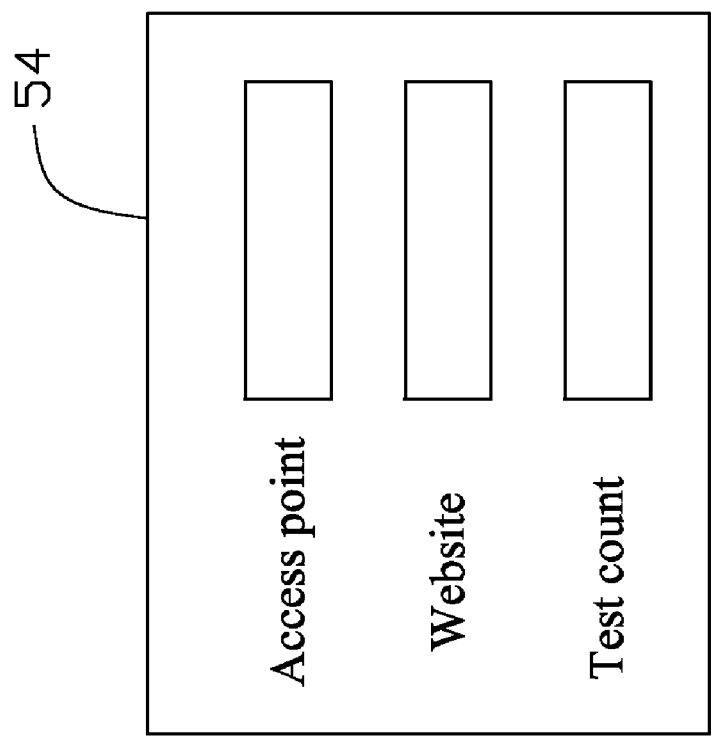
FIG. 2 is a schematic view of a test parameter input interface of the system of FIG. 1.

Referring to FIGS. 1 and 2, a system for testing wireless connection function of a mobile phone, in accordance with an embodiment, includes an access point 10 which is connected to the Internet, and a mobile phone 50 which needs to be tested. The mobile phone 50 includes a wireless module 51 (such as a WIFI module), a control module 53, and a screen 54. The control module 53 is capable of turning on or off the wireless module 51.

Referring to FIG. 2, a test parameter input interface on the screen 54 is shown to input test parameters in the control module 53. The test parameters may include names of the access points, websites, and a test count. The test parameters can be set in different patterns.

For example, in a first pattern, set an access point, such as "AP1", set a website, such as "www.1.com", and set a test count, such as five times. Therefore, in test, the mobile phone 50 connects to the access point AP1, and then accesses the website "www.1.com". The above test steps are repeated five times.

In a second pattern, set a plurality of access points, such as "AP1", "AP2", "AP3", set a website, such as "www.1.com", and do not set a test count. Therefore, in test, the mobile phone 50 in turn connects to each of the plurality of access points, and accesses the website "www.1.com" through each of the access points.

In a third pattern, set an access point, such as "AP1", a plurality of websites, such as "www.1.com", "www.2.com", "www.3.com"; and do not set test count. Therefore, in test, the mobile phone 50 connects to the access point AP1 for a plurality of times, and accesses a different website each time connected to the access point AP1.

Figure 3:
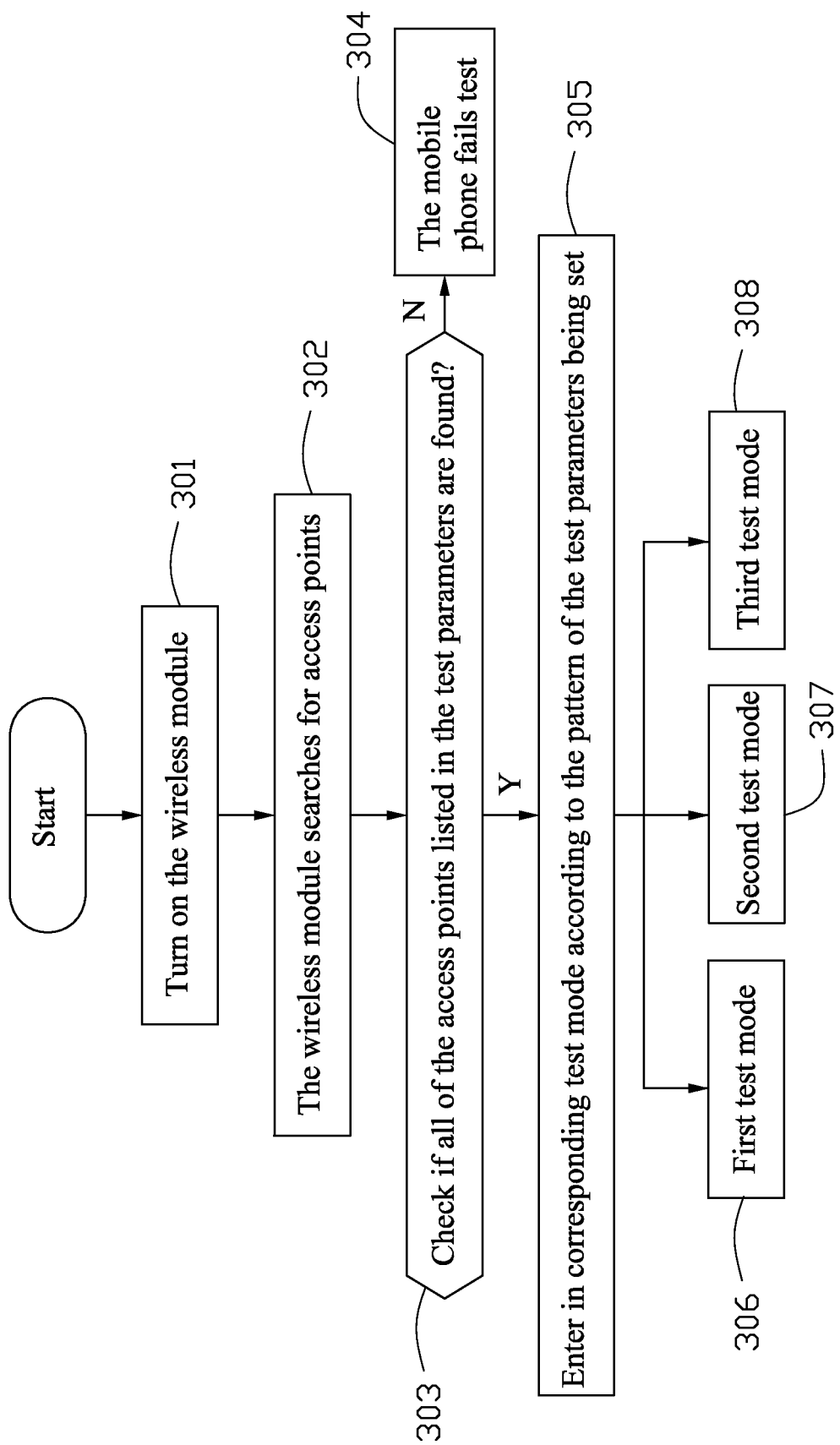
FIG. 3 is a flow chart of a method of an embodiment for testing wireless connection function of a mobile phone.

Referring to FIG. 3, a method for testing a wireless connection function of the mobile phone 50, is shown as follows:

In step 301, the control module 53 of the mobile phone 50 turns on the wireless module 51; then go to step 302.

In step 302, the wireless module 51 searches for access points; then go to step 303.

In step 303, check if all of the access points listed in the test parameters are found; if all of the access points are not found, go to step 304; if all of the access points are found, go to step 305.

In step 304, the mobile phone fails test.

In step 305, check the pattern of the test parameters being set; if the parameters are set in the first pattern, go to a first test mode of step 306; if the parameters are set in the second pattern, go to a first test mode of step 307; if the parameters are set in the third pattern, go to a third test mode of step 308.

Figure 4:
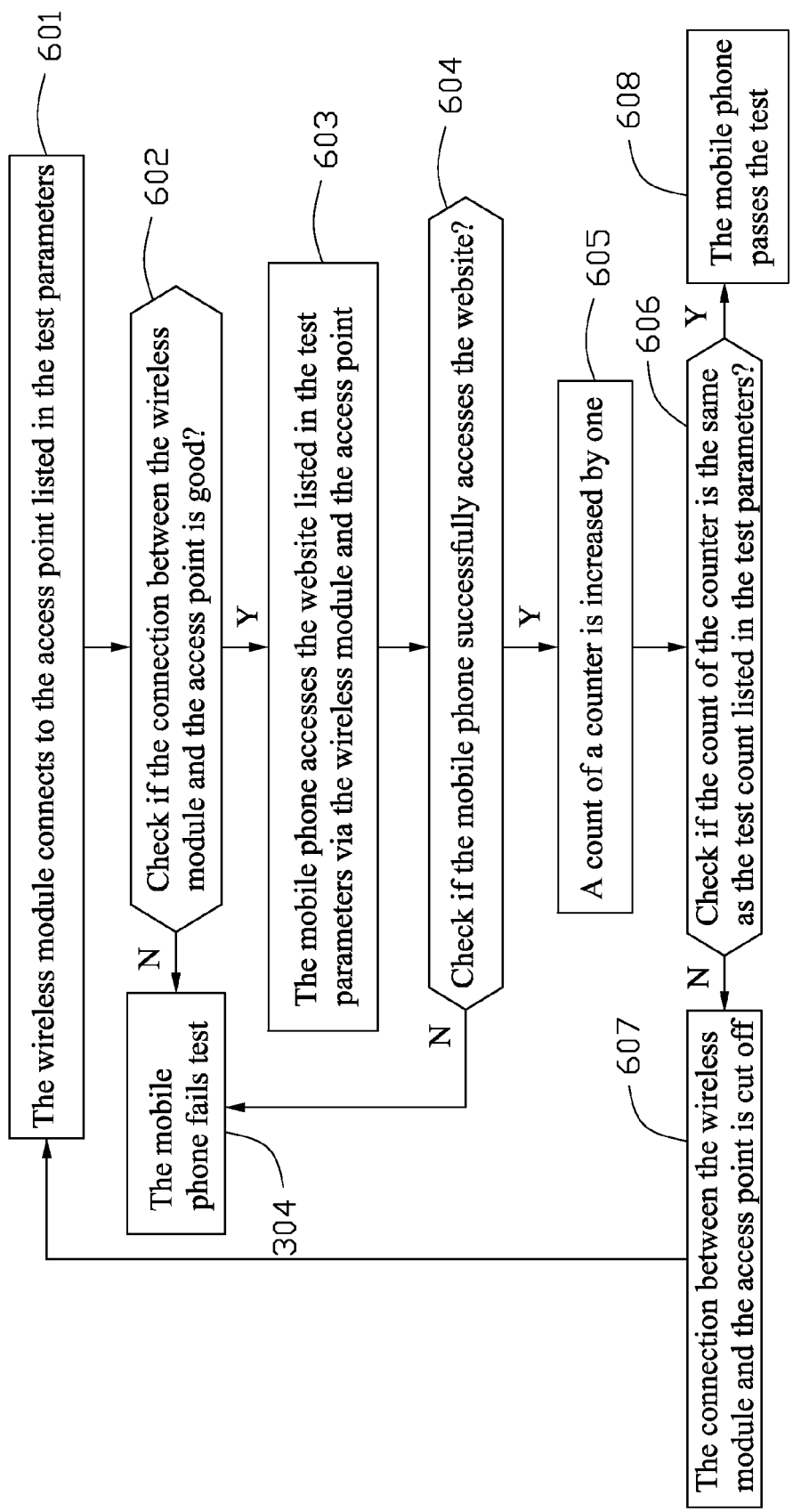
FIG. 4 is a detailed flow chart of a step 306 of the method of FIG. 3.

Referring to FIG. 4, detail steps of the step 306 are shown as follows:

In step 601, the wireless module 51 connects to the access point listed in the test parameters; then go to step 602.

In step 602, check if the connection between the wireless module 51 and the access point is good; if it is, go to step 603; if it is not, go to step 304, and the mobile phone 50 fails test.

In step 603, the mobile phone 50 accesses the website listed in the test parameters via the wireless module 51 and the access point; then go to 604.

In step 604, check if the mobile phone 50 successfully accesses the website; if it does, go to step 605; if it does not, go to step 304, and the mobile phone 50 fails.

In step 605, a counter, whose initial count is zero, is incremented by one; then go to step 606.

In step 606, check if the count of the counter is the same as the test count listed in the test parameters; if it is, go to step 608; if it is not, go to step 607.

In step 607, the connection between the wireless module 51 and the access point is cut off; then go back to step 601.

In step 608, the mobile phone 50 passes the test, and the count of the counter is reset to zero.

Figure 5:
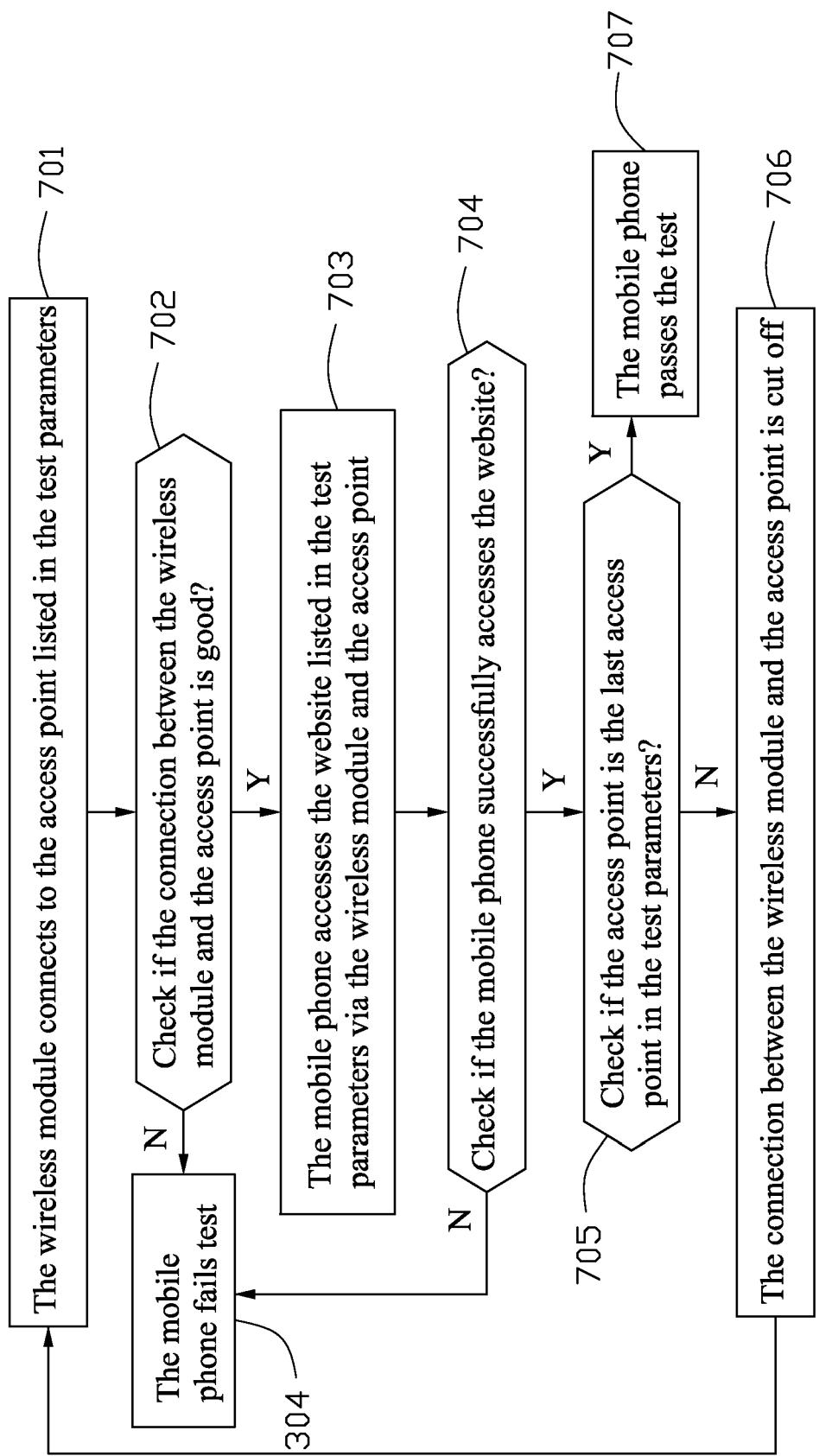
FIG. 5 is a detailed flow chart of a step 307 of the method of FIG. 3.

Referring to FIG. 5, detail steps of the step 307 are shown as follows:

In step 701, the wireless module 51 connects to the first access point listed in the test parameters; then go to step 702.

In step 702, check if the connection between the wireless module 51 and the access point is good; if it is, go to step 703; if it is not, go to step 304, and the mobile phone 50 fails.

In step 703, the mobile phone 50 accesses the website listed in the test parameters via the wireless module 51 and the access point; then go to step 704.

In step 704, check if the mobile phone 50 successfully accesses the website; if it does, go to step 705; if it does not, go to step 304, and the mobile phone 50 fails.

In step 705, check if the access point is the last access point in the test parameters; if it is not, go to step 706; if it is, go to step 707.

In step 706, the connection between the wireless module 51 and the access point is cut off; then go back to step 601, and connect to next access point.

In step 707, the mobile phone 50 passes the test.

Figure 6:
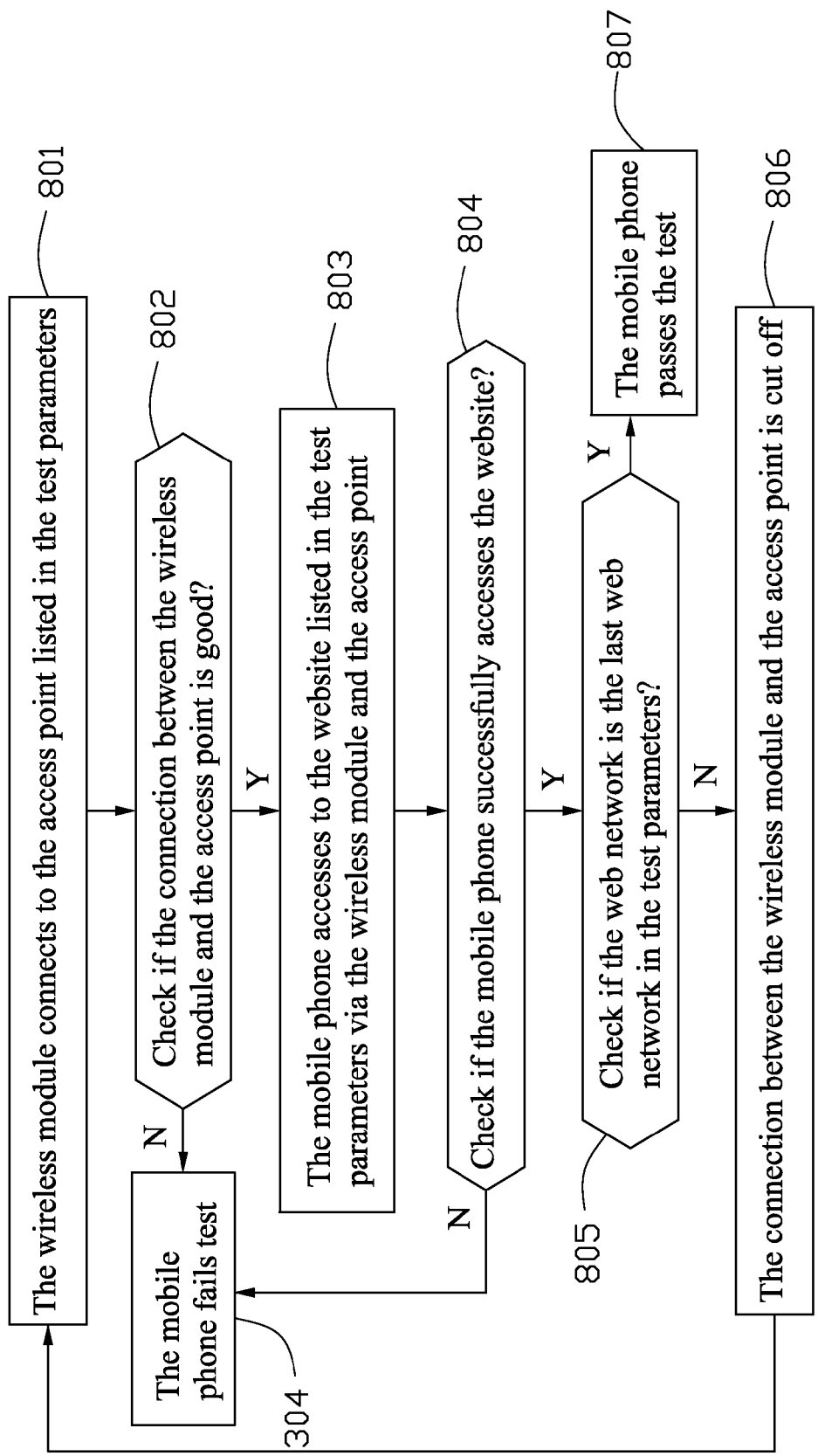
FIG. 6 is a detailed flow chart of a step 308 of the method of FIG. 3.

Referring to FIG. 6, detail steps of the step 307 are shown as follows:

In step 801, the wireless module 51 connects to the access point listed in the test parameters; then go to step 802.

In step 802, check if the connection between the wireless module 51 and the access point is good; if it is, go to step 803; if it is not, go to step 304, and the mobile phone 50 fails.

In step 803, the mobile phone 50 accesses to the first website listed in the test parameters via the wireless module 51 and the access point; then go to 804.

In step 804, check if the mobile phone 50 successfully accesses the website; if it does, go to step 805; if it does not, go to step 304, and the mobile phone 50 fails.

In step 805, check if the web network is the last web network in the test parameters; if it is not, go to step 806; if it is, go to step 807.

In step 806, the connection between the wireless module 51 and the access point is cut off; then go back to step 801, and connect to the access point again to access the next website.

In step 807, the mobile phone 50 passes the test.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for testing wireless connection function of a mobile phone,
comprising following steps:
firstly, pre-setting a plurality of pre-set access points;
secondly, turning on a wireless module of the mobile phone;
thirdly, the wireless module searching for access points;
fourthly, determining if all the plurality of pre-set access points are found in the access points; wherein a plurality of test parameters are pre-set, the plurality of test parameter comprises the first pre-set website and the plurality of pre-set access points which comprises the first pre-set access point, the mobile phone in turn connects to each of the plurality of pre-set access points, and accesses the first website through each of the plurality of pre-set access points;
fifthly, when the plurality of pre-set access points are found in the access points, the wireless module is connected to a first pre-set access point in the searched access points; and
sixthly, the mobile phone accessing a first pre-set website via the wireless module and the first pre-set access point;
seventhly, the mobile phone in turn connected to other pre-set access points to access other pre-set websites via the wireless module until all of the plurality of pre-set access points have been connected.

2. The method of claim 1, wherein after the mobile phone accesses to the first pre-set website, a connection between the wireless module and the first pre-set access point is cut off, and then the wireless module connects to next pre-set access points.

3. The method of claim 1, wherein a plurality of test parameters are pre-set, the plurality of test parameter comprises the first pre-set access point and a plurality of pre-set websites which comprises the first pre-set website, the mobile phone in turn accesses each of the websites via the first pre-set access point.

4. The method of claim 3, wherein after the mobile phone accesses to the first pre-set website, a connection between the wireless module and the first pre-set access point is cut off, and then the wireless module connects to the first pre-set access point again to access next pre-set website.

5. The method of claim 1, wherein a plurality of test parameters are pre-set, the plurality of test parameter comprises the first pre-set access point, the first pre-set website, and a test count, the mobile phone repeatedly connects to the first pre-set access point, and accesses the first pre-set website a number of times according to a value of the test count.

6. A method for testing wireless connection function of a mobile phone, comprising following steps:
firstly pre-set a plurality of test parameters in a control module of the mobile phone, the plurality of test parameters comprising a first pre-set access point and a first pre-set website;
secondly, the control module turning on a wireless module of the mobile phone;
thirdly, the wireless module searching for access points, and determining if the first pre-set access point is listed in the searched access points; wherein the plurality of test parameter comprises a plurality of pre-set access points which comprises the first pre-set access point, the mobile phone in turn connects to each of the plurality of pre-set access points, and accesses the first website when connecting to each of the plurality of pre-set access points;
if the first pre-set is listed in the searched access points, the wireless module connected to the first pre-set access point; and
the mobile phone accessing the first pre-set website via the wireless module and the first pre-set access point.

7. The method of claim 1, wherein after the mobile phone accesses the first pre-set website, a connection between the wireless module and the first pre-set access point is cut off, and then the wireless module connects to next pre-set access points.

8. The method of claim 6, wherein the plurality of test parameter comprises a plurality of pre-set websites which includes the first pre-set website, the mobile phone in turn accesses each of the plurality of websites via the first pre-set access point.

9. The method of claim 8, wherein after the mobile phone accesses the first pre-set website, a connection between the wireless module and the first pre-set access point is cut off, and then the wireless module connects to the first pre-set access point again to access next pre-set website.

10. The method of claim 6, wherein the plurality of test parameter further comprises a test count, the mobile phone repeatedly connects to the first pre-set access point, and accesses the first pre-set website a number of times according to a value of the test count.

* * * * *